June 28, 1938.     G. W. WHEELWRIGHT, 3D     2,122,225
SIGNALING DEVICE EMPLOYING POLARIZED LIGHT
Filed Aug. 25, 1937
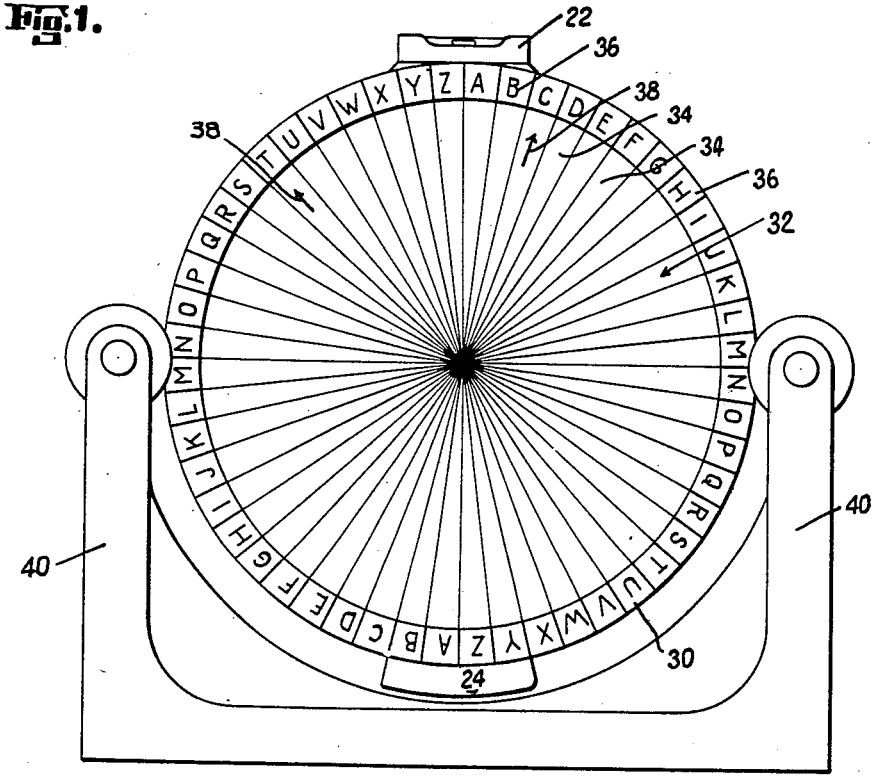
Fig. 1.
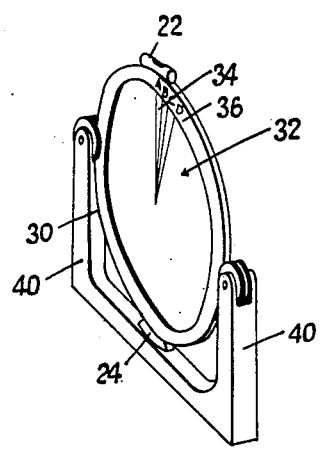
Fig. 2.
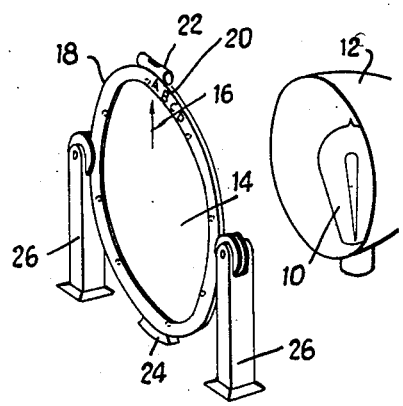
INVENTOR.
George W. Wheelwright, 3rd
BY Brown & Jones
ATTORNEYS.

UNITED STATES PATENT OFFICE 2,122,225

SIGNALING DEVICE EMPLOYING POLARIZED LIGHT

George W. Wheelwright, 3rd, Dover, Mass., assignor to Sheet Polarizer Company, Inc., Union City, N. J., a corporation of New Jersey Application August 25, 1937, Serial No. 160,753

9 Claims. (Cl. 250—8)

This invention relates to new and improved signaling systems, and more particularly to signaling systems employing polarized light.

An object of the invention is to provide means for transmitting signals over a beam of light, and more particularly a beam of polarized light, under such conditions that an observer equipped with a suitable analyzer may directly read the signal transmitted while the beam carrying the signal will appear unchanging to an observer unequipped with such an analyzer.

A further object of the invention is to provide signaling apparatus to accomplish the desired result wherein polarized light is employed at all times to transmit the signal.

A still further object of the invention is to provide, in connection with apparatus of the character described, receiving means adapted to permit instantaneous reading of the signals transmitted, and which may more specifically comprise a plurality of adjacent areas of light-polarizing material, the material of each area being positioned with its polarizing axis at a predetermined angle to the polarizing axes of the materials of the other areas, whereby alteration in the plane of polarization of the transmitted beam may be instantaneously perceived and the degree of alteration ascertained.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Figure 1 is a view in elevation of a portion of the analyzing means and associated elements employed at the receiving end; and Fig. 2 is a view somewhat diagrammatical and in perspective of apparatus for sending and receiving.

The use of polarized light in connection with the transmission of visible signals has heretofore been suggested. The apparatus heretofore suggested for such use has comprised generally a sending apparatus equipped with means either to provide a polarized light beam and an unpolarized light beam, or where a polarized beam alone is employed in the transmission of signals, a sending apparatus has been suggested wherein the plane of polarization has been rotated rapidly through an angle of 90°. In every case, an observer equipped with an analyzer adapted to block the polarized light transmitted from the sender of the first system and adapted to block such of the light as is transmitted from the sending apparatus of the second system when the plane of polarization is rotated through a predetermined angle, saw in effect a beam which was periodically interrupted, so that the signals transmitted were of the dot-dash or code order.

This invention contemplates the provision of apparatus employing polarized light, and more specifically plane-polarized light, in the transmission of signals, said apparatus being of a kind differing substantially from apparatus heretofore used in that the signals transmitted need not be in code, but on the other hand may be of the character of separate letters, so that signals may be transmitted with great rapidity and read on the receiving end of the system with surety and ease.

The apparatus of the present invention comprises generally signal-sending means comprising a light source 10, a reflector 12 to direct the beam emanating from the source, and a rotatable light-polarizing element 14 positioned to intercept beams emanating from the source. This rotatable polarizing element may preferably take the form of a thin, sheet-like light polarizer. The material sold under the trade name "Polaroid" is admirably adapted for the uses of this invention. Polaroid comprises a set suspension of oriented polarizing particles in a light-transmitting medium. It is available in sheet form in large areas. It may be laminated readily to a transparent supporting plate. It may be waterproofed. It may be adapted for use with a light source of considerable area and considerable intensity, so that if desired a broad, powerful beam may be projected in the direction of the receiving apparatus, or in the direction of groups of receiving apparatus.

Where a polarizing material laminated to a transparent support is employed in the present invention, care should be taken to insure the use of a support which will not tend to show photo-elastic effects when the device is in operation, or the polarizing element should be so mounted that any such support is positioned between it and the light source.

The polarizing element may comprise, if desired, any other suitable material. While Polaroid is mentioned as a preferred material, other materials of the same general character, or in fact any suitable light-polarizing means adapted for rotation and ready positioning in the manner hereinafter described, may be employed to advantage in the present invention.

The polarizing element is preferably provided with indicia, such for example as the arrow 16 shown in Fig. 2, to indicate the direction of the polarizing axis of the material, and this arrow or other indicia may advantageously be positioned closely adjacent the frame 18 or mounting means in which the polarizing element rotates. This frame may also preferably be provided with a plurality of indicia, 20, such for example as the letters of the alphabet, punctuation marks and the like, and this series of letters or other indicia should preferably extend around substantially half the frame, so that rotation of the polarizing element of the sending apparatus through a plurality of positions within an angle of approximately 180° will bring the indicia or arrow 16 thereon into alignment with each of the indicia on the frame.

The sending apparatus should preferably be provided with means, for example, the level 22 or the weight 24 at the bottom of the frame, to insure that the position of the frame is in a predetermined preferred position before the device is employed in the sending of signals. To this end the entire frame, including the rotatable polarizing element carried thereby, should be adapted for rotation upon its supporting elements 26, at least within a reasonable angle, so that unevenness in the ground or platform upon which the device is placed may be overcome and the frame properly leveled or positioned for the purposes hereinafter to be described.

The receiving apparatus may comprise generally a somewhat similar frame 30, provided with similar means, if desired, to permit a suitable positioning or leveling of the frame, so that when the sending apparatus and the receiving apparatus are properly positioned, the indicia upon the frame of each corresponds substantially exactly for a position vertically above the support and for all positions at angles thereto.

Within the frame of the receiving device, light-polarizing means 32 may be fixedly positioned. This light-polarizing means may comprise a plurality of sectors 34 of light-polarizing material, for example the material Polaroid hereinbefore described. These sectors should preferably correspond in number to the number of different indicia 36 appearing upon the frame of the receiving apparatus. A preferred form for the receiving apparatus is that shown in Fig. 1, where the sectors or segments of light-polarizing material are so mounted that the polarizing axis of each sector or segment is substantially parallel to the radius from the center of the receiving device to the center of the indicia on the frame thereof adjacent the outer end of each sector. The polarizing axes of the sectors forming the receiving device are designated by the arrows 38. Polaroid forms a highly preferred material for use in connection with such a receiving apparatus, as it may be cut into segments or sectors of the desired shape, each of which may be laminated in the desired relation to each of the others or to a supporting plate.

While the receiving apparatus has been shown as comprising a mounting means 40, a frame 30 and a polarizing assemblage 32 mounted therein, with means to level or assure proper positioning of the entire apparatus, it is to be understood that much more simple devices may be employed within the scope of the invention. For example, field glasses equipped with a sector receiver and suitable indicia associated therewith might be employed, in which case it would be only necessary for the receiver to hold his glasses firmly in a predetermined position, which might be fixed by having the sending apparatus transmit a beam of plane-polarized light without rotation thereof periodically, so that the receiver could adjust the receiving apparatus to the plane of polarization of this beam, which might be called the key beam. All such modifications of the device are deemed to fall within the scope of the invention.

In operation, the sending means and the receiving means are first positioned, leveled and aligned so that a beam emanating from the sending apparatus will fall upon the analyzer of the receiver and so that the indicia appearing upon the receiver are aligned with and correspond to the indicia appearing upon the sending apparatus. As the polarizing element of the sending apparatus is rotated, one sector in the receiving apparatus, i. e., that sector whose plane of polarization is at right angles to the plane of polarization of the sending apparatus, will be darker than all other sectors in the receiving apparatus. A preferred form of mounting the polarizers of the receiver and the sender is one wherein the sector corresponding, for example, to the letter "A" in the receiving apparatus is darker than all other sectors when the receiving apparatus has been positioned so that the indicia on the rotatable polarizer thereof points to the letter "A" on the frame thereof. When this type of mounting is employed, the sender may spell out the signal to be transmitted by simply rotating the polarizing element of the sending apparatus so that the arrow or other indicia thereon representative of its plane of polarization is progressively moved adjacent the letters and/or punctuation in the message to be transmitted. When this is done, the sectors corresponding to such letters and/or punctuation will progressively appear darkest in the receiving apparatus, and the observer stationed at the receiver will be able to spell out the message which is being transmitted easily and accurately. It will be obvious that messages may be transmitted in code and that punctuation may, if desired, be omitted to the end that fewer sectors need be employed.

The type of mounting described above, i. e., the type wherein the sector corresponding to the desired letter transmitted becomes darkest in the receiving apparatus, is a preferred arrangement because the eye of an observer is much more sensitive to degrees of extinction near complete extinction than it is to fluctuations in intensity near maximum transmission of the polarizing elements, i. e., it is much easier to distinguish the darkest sector than it is the lightest sector.

If the device of the present invention includes each letter of the alphabet, the angular difference between adjacent sectors may be approximately 7°. This is sufficient to enable the observer to accurately distinguish and to instantaneously read the message being transmitted.

It will be obvious that rotation of the polarizing element at the sending apparatus will be absolutely invisible to anyone not equipped with a suitable analyzing device, so that the signals transmitted cannot be intercepted and read by anyone not equipped with an analyzer provided with sectors corresponding to the indicia on the sending apparatus. It will also be apparent that the relative positions of the entire group of indicia on the sender and receiver may be changed at will by the operators, even during the transmission of a message, and hence the danger of interception of the transmitted signals may be substantially reduced.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and useful and desire to secure by Letters Patent is:

1. In signaling apparatus of the character described, in combination, means to provide a beam of light, a rotatable light-polarizing element positioned to intercept said beam, indicia positioned adjacent said polarizing element, means to indicate the relative position of the polarizing axis of said element with respect to each of said indicia, an analyzer interposed in the path of said polarized beam and comprising a plurality of light-polarizing elements mounted to intercept said beam, each of said elements having its polarizing axis at a predetermined angle with the polarizing axis of each of said other elements, and indicia associated with each of said polarizing elements and corresponding to the indicia associated with the rotatable polarizing element adjacent the light source.

2. In signaling apparatus of the character described, in combination, means to provide a beam of light, a rotatable light-polarizing element positioned to intercept said beam, indicia positioned adjacent said polarizing element, means to indicate the relative position of the polarizing axis of said element with respect to each of said indicia, an analyzer positioned to intercept said polarized beam and comprising a light-polarizing element formed with a plurality of segments, the polarizing axis of each segment being at a predetermined angle to the polarizing axis of each of the other segments, and indicia associated with said segments and corresponding to the indicia associated with the rotatable polarizing element adjacent the light source.

3. In signaling apparatus of the character described, in combination, means to provide a beam of light, a rotatable light-polarizing element positioned to intercept said beam, indicia positioned adjacent said polarizing element, means to indicate the relative position of the polarizing axis of said element with respect to each of said indicia, an analyzer interposed in the path of said polarized beam and comprising a plurality of light-polarizing elements mounted to intercept said beam, each of said elements having its polarizing axis at a predetermined angle with the polarizing axis of each of said other elements, indicia associated with each of said polarizing elements and corresponding to the indicia associated with the rotatable polarizing element adjacent the light source, and means associated with said analyzer for positioning said element and its associated indicia predeterminedly with respect to the position of the indicia associated with the polarizing element adjacent said light source.

4. Signaling apparatus comprising, in combination, means to project a beam of plane-polarized light, means to effect predetermined rotation of the plane of polarization of said beam, analyzing means comprising a plurality of light-polarizing elements each positioned to intercept said polarized beam, and means to so position the elements of said plurality that at least a different one of said elements will appear dark with every predetermined alteration in the plane of polarization of the beam emitted from said source.

5. An analyzer for plane-polarized light in signaling systems and the like comprising mounting means, a plurality of light-polarizing elements positioned within said mounting means with their polarizing axes at predetermined angles to each other whereby one of said elements will appear darker than all of the other of said elements when a plane-polarized beam impinges upon said elements, and indicia associated with said elements to provide means for rapidly recording changes in the direction of vibration of a plane-polarized beam impinging upon said elements.

6. Signaling apparatus comprising, in combination, means to project a beam of plane-polarized light, means to effect predetermined rotation of the plane of polarization of said beam, and analyzing means comprising a substantially circular light-polarizing element comprising a plurality of polarizing sectors, the polarizing axis of each sector being substantially parallel to the radius of said element bisecting said sector, the polarizing axes of each pair of adjacent sectors making with each other an angle not exceeding 120°.

7. Signaling apparatus comprising, in combination, means to project a beam of plane-polarized light, means to effect predetermined rotation of the plane of polarization of said beam, and analyzing means comprising a substantially circular light-polarizing element comprising a plurality of light-polarizing sectors, the polarizing axis of each sector being at the same predetermined angle to the radius of said element bisecting said sector as the polarizing axis of each of the other of said sectors, the polarizing axes of each pair of adjacent sectors making with each other an angle less than 90°.

8. Signaling apparatus comprising, in combination, means to project a beam of plane-polarized light, means to effect predetermined rotation of the plane of polarization of said beam, and analyzing means comprising a substantially circular light-polarizing element comprising a plurality of light-polarizing sectors, the polarizing axis of each sector being at the same predetermined angle to the radius of said element bisecting said sector as the polarizing axis of each of the other of said sectors, the polarizing axes of each pair of adjacent sectors making with each other an angle less than 90°, and a plurality of different indicia associated with said polarizing element, at least one of said indicia being associated with each of a plurality of said sectors.

9. Signaling apparatus comprising, in combination, a light source, a reflector to direct the beams emanating from said source, a relatively thin, sheet-like polarizing element interposed in the path of the beam emanating from said source, means to permit rotation of said element, indicia associated with said element and fixed with respect to the mounting means therefor whereby rotation of said element alters the position of the polarizing axis thereof with respect to each of said indicia, means associated with said polarizing element to indicate the position of its axis with respect to said indicia, an analyzer for viewing said polarized beam comprising a light-polarizing element comprising a plurality of sectors, indicia associated with said sectors and corresponding to the indicia associated with the polarizing element adjacent the light source, there being at least one sector for each of the indicia associated with said analyzer, said sectors being so positioned with respect to each other and with respect to the indicia associated with said analyzer that one of said sectors appears darker than the others of said sectors, and the indicia associated with said darker sector correspond with the indicia associated with the polarizing axis of the rotatable polarizing element adjacent the light source.

GEORGE W. WHEELWRIGHT, 3RD.